Dec. 30, 1969     R. W. THIELE ET AL     3,487,409
REFLECTED-BEAM SYSTEM
Filed Sept. 3, 1968
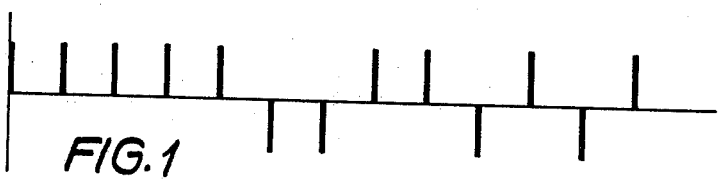
FIG. 1
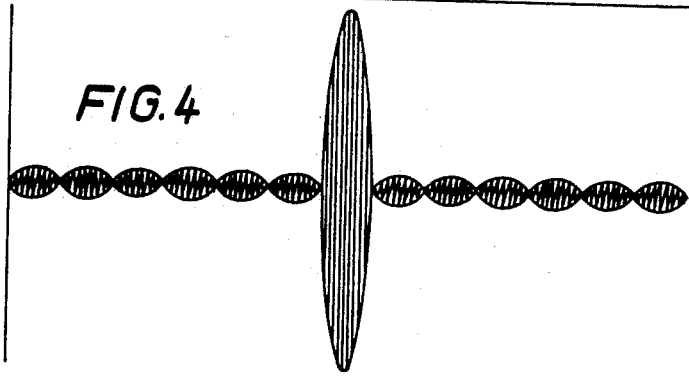
FIG. 2
FIG. 3
FIG. 4
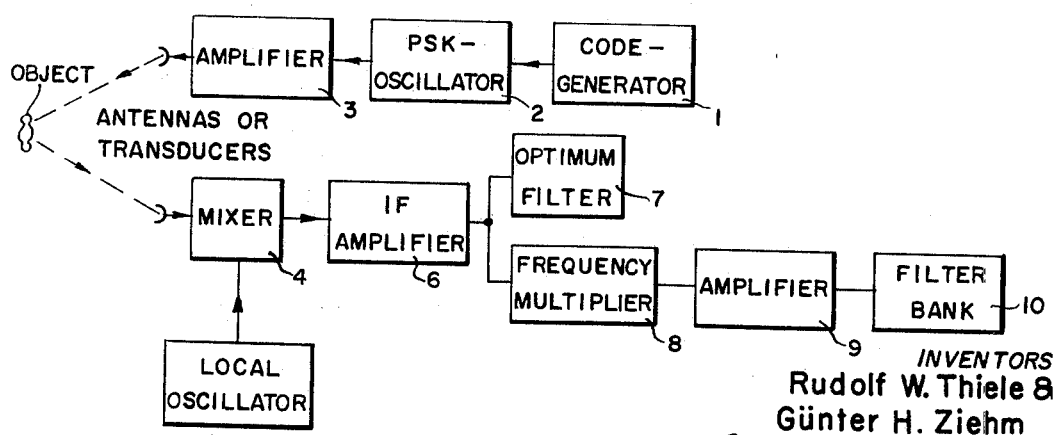
FIG. 5
INVENTORS
Rudolf W. Thiele &
Günter H. Ziehm
BY *Spencer & Kaye*
ATTORNEYS United States Patent Office 3,487,409
Patented Dec. 30, 1969

3,487,409
REFLECTED-BEAM SYSTEM
Rudolf W. Thiele, Bremen, and Günter H. Ziehm, Kiel, Germany, assignors to Fried Krupp Gesellschaft mit beschrankter Haftung, Essen, Germany
Filed Sept. 3, 1968, Ser. No. 756,967
Claims priority, application Germany, Sept. 2, 1967, 1,673,363
Int. Cl. G01s 7/30
U.S. Cl. 343—17.2
7 Claims

ABSTRACT OF THE DISCLOSURE

Arrangement and method for obtaining information regarding distant objects using a reflected-beam in which a transmitted signal is modulated to a shift in phase of $2\pi/K$, where K equals a constant, according to selection rules for optimum distance-resolving codes. Moreover the echo signals received from such objects are optimized for distance resolution and the frequency of the echo signals is multiplied by K in order to provide resolution of Doppler information, which is carried by the echo signals.

BACKGROUND OF THE INVENTION

The present invention relates to an arrangement and method for modulating and demodulating pulses of radar and sonar systems which provide good distance resolution of the signal received from the sounded objects and, simultaneously, an improvement in the Doppler resolution of the received signals.

In the case of the reflected-beam navigation art, i.e., in the case of electromagnetic waves where radar is concerned or in the case of sound waves in water where sonar is concerned, there is always the difficulty that the use of short pulses allows for determining the exact distance of the sounded object, while providing an inaccurate Doppler recognition or that the use of long pulses results in obtaining exact Doppler recognition, while sacrificing accurate distance determination. The disadvantages of both approaches discussed above applies particularly to sine-wave sound pulses.

Similar disadvantages are encountered even when coded pulses (i.e., signals which are frequency- or phase-modulated in some manner) or scanned pulse signals are used. In reflected-beam systems, coded signals are used in conjunction with optimum filters provided at the receiving end for several reasons. One reason for using optimum filters is in order to provide as much signal energy as possible in a signal occupying a longer period of time, while utilizing the best possible emittable intensity. Another reason is in order to achieve an improvement in the signal-to-noise ratio.

More widely known are systems where the pulses are coded by means of frequency modulation with continuously increasing or decreasing frequency within the pulse duration. At the receiving end of such a system, so-called "pulse compression filters" (Turin, G. D., An Introduction to Matched Filters, Trans. IRE PGIT–6, 1960, pp. 311–329) are used as optimum filters which, due to the different durations of the individual frequencies of the transmitted pulse, accomplish a timely pulse compression so that, in spite of a longer pulse duration, a high distance resolution is possible. The Doppler resolution, however, is lost at first. In order to derive the Doppler information, it is necessary to provide complicated technical means.

Another type of pulse coding has become known. In this type of pulse coding the pulse takes the form of quasi-static noise, which is known in English-language literature by the name of "pseudorandom noise" (Berkovitz, R. S., Modern Radar, published by Wiley, 1965, pp. 274 and 285).

In this field, Barker (see reference to Berkovitz above) particularly analyzed such quasi-static stage sequences which possess the characteristic that their autocorrelation at $\tau=0$ exhibits a maximum which is substantially higher than for $\tau$ at any other value.

Such quasi-static stage sequences, called "Barker sequences" are for example, set forth below.

7-stage Barker sequence $+1+1+1-1-1-1+1-1$
11-stage Barker sequence
$+1+1+1-1-1-1+1-1-1+1-1$
13-stage Barfker sequence
$+1+1+1+1+1-1-1+1+1-1+1-1+1$ For such Barker sequences it is also easy to construct optimum filters which result in a strong pulse compression in spite of long sending pulse durations.[1] However, where this is done, the Doppler information is no longer contained in the signal.

The simultaneous requirement for good distance resolution and Doppler resolution can be achieved in the known methods only by compromise. The mathematical formulation is accomplished by the "ambiguity function" (see P. M. Woodward, Probability and Informations Theory With Application to Radar, Pergamon Press, 1964, p. 118 ff.).

SUMMARY OF THE INVENTION

It is an object of the present invention to code the pulses in such a manner that with high distance resolution achieved by means of optimum filters on the receiving end a good Doppler resolution is also assured.

For this purpose, an arrangement and method for modulation and demodulation of pulses in reflected-beam position-finding systems is provided in which the phase of transmitted pulses is modulated according to selection rules for optimum distance-resolving codes in conjunction with optimum filters at the receiving end. In a preferred form, the arrangement and method of the present invention provides, at the transmitting end, that the phases of the transmitted pulses are shifted only by 180° and, at the receiving end, the signals are used as IF signals with doubled frequency, if required, and are subsequently frequency-analyzed in a known matter.

BRIEF DESCRIPTION OF THE DRAWING

FIGURE 1 shows a 13-stage Barker sequence.
FIGURE 2 shows a phase modulation of a high-frequency oscillation which is accomplished by the transmitter.
FIGURE 3 shows a complete transmitted signal.
FIGURE 4 shows the signal at the receiving end of the system, after passing through an optimum filter.
FIGURE 5 shows a block circuit diagram of the transmitter and receiver.

DESCRIPTION OF THE PREFERRED EMBODIMENTS

Referring to FIGURE 1, a 13-stage Barker sequence is illustrated. For such a Barker sequence, an optimum filter may be consrtucted which results in strong pulse compression in spite of long pulse sending periods of time.

Referring to FIGURE 2 a phase modulated high-frequency transmitter pulse is illustrated in which the frequency is at phase zero when the Barker stage is $+1$ and it is at another defined phase when the Barker stage is $-1$.

---
[1] Schäfer, H., Der Radarempfänger als Optimalfilter und Korrelator, NTZ 20, 1967, pp. 218–226.

FIGURE 3 illustrates a complete transmitted signal which is provided with 13 stage sequences.

Referring to FIGURE 4, this shows the echo of the transmitted signal from a distant object, after passing through a receiving channel provided with an optimum filter. As indicated by the steep center of the signal illustrated, it is suitable for high distance resolution. Once the echo signal is passed through an aptimum filter to render a signal, as shown in FIGURE 4, the Doppler information contained therein is destroyed.

Referring to FIGURE 5 this shows a block circuit diagram of the transmitter and the recevier. The transmitter consists of a generator for the modulating code 1, an high-frequency oscillator which is suitable for phase shift keying 2, and a power amplifier 3. The receiver includes a mixer stager 4 with local oscillator 5 and an intermediate frequency amplifier 6 as well as both an optimum filter 7 for high distance resolution and a frequency multiplier 8 which is used, according to the present invention, to provide Doppler information.

The operation of the present invention, particularly with regard to FIGURE 5, is as follows. Phase modulated, high frequency oscillators are used as transmission signals. Such signals are phase-modulated in the stages of a Barker sequence with the reference phase being zero when the Barker stage is +1 and with the reference phase being 180° when the Barker stage is −1.

These transmitted signals are received, after being reflected by objects as echoes, by known radar or sonar receiving systems and are amplified, prefiltered and generally mixed into a suitable intermediate frequency (IF).

The range of intermediate frequencies which have been found suitable for the use in reflected-beam systems as in the present invention is from about 10 kHz. in the sonar case to about 40 mHz. in the radar case.

These IF signals are further processed in two ways, as shown in FIGURE 5, after leaving the IF amplifier 6. First, the IF signals travel via the optimum filter 7, in a known manner, as described above, to provide a signal as illustrated in FIGURE 4. A signal such as that shown in FIGURE 4 assures a high distance resolution. Second, the IF signals travel, via a frequency multiplier 8 in order to derive the Doppler information.

The frequency multiplier 8 is constructed in a particular manner, according to the preferred embodiment, so that it doubles the frequency or places it upwards at a value of $k = 2n$ ($n = 1, 2, 3 \ldots$), where $n$ is an integer.

If during any Barker stage, the voltage at the input is $$/\mu_E(t) = A \sin [ (\Omega_{ZF} + \Delta\omega_{Doppler})t\ \varphi(t) ] \quad (a)$$

where A is the amplitude and $\Omega_{ZF}$ is the intermediate frequency of the circuit; $\Delta\omega_{Doppler}$ is the circuit frequency change due to the Doppler effect; and $\varphi(t)$ the phase of the elements of the signal which is 0° or 180° depending on the particular Barker stage, the voltage at the output of the frequency doubler will be $$/\mu_A(t) =_B \sin\ ^2[(\Omega_{ZF} + \Delta\omega_{Doppler}) + (t)] \quad (b)$$

In Equation b we have no time varying phase term because $2 \times 0° = 0°$ and $2 \times 180° = 360° = 0°$.

After the frequency doubling stage 8 there follows the known frequency analyzing or evaluating means, for instance, an amplifier 9 and a filter bank 10 connected thereto. Any other known frequency analyzing or evaluating means can also be used.

The present invention is not limited to the illustrated example. All reflected-beam position-finding systems which use transmitted signals with phase modulation and which operate in conjunction with optimum filters for high distance resolution at the receiving end can be operated with transmitted signals which are exclusively modulated in 0° or 180° stages and the Doppler information can then be derived at the receiving end by using a parallel channel to the optimum filters having means for multiplying the original frequency or a suitable intermediate frequency by a value of $2n$.

It is possible to arrange the phase modulation in the individual Barker stages in such a manner that at stage +1 the phase is modulated to zero and at stage −1 the phase is modulated to 120°. It is then necessary at the receiving end to triple the frequency at the receiving end instead of doubling it and the same result can thus be achieved.

In general, the modulation can be accomplished in such a manner that at Barker stage +1 the phase is modulated to zero and at Barker stage −1 the phase is modulated to a value represented by the formula $2\pi/K$ where $K = 2n$ ($n = 1, 2, 3 \ldots$), and that at the receiving end the frequency multiplier means is set to provide the k-fold value for the frequency.

It will be understood that the above description of the present invention is susceptible to various modifications, changes and adaptations.

What is claimed is:

1. Arrangement for obtaining information regarding distant objects using a reflected beam comprising in combination:
    (a) means for modulating signals, which are transmitted according to selection rules for optimum distance resolving codes, by providing a $2\pi/K$ phase shift, where K is an integer equal to at least 2;
    (b) means for receiving the echo signals of said transmitted signals from sounded objects and for obtaining information therefrom including:
        (1) optimum filter means for optimizing the distance resolution of the received echo signals;
        (2) frequency multiplier means for multiplying the frequency of the received signals by a factor of K in order to provide resolution of Doppler information carried by such signals; and
        (3) means connected to said frequency multiplier means for analyzing the K-multiplied received signals.

2. Arrangement as defined in claim 1 further comprising means for providing an IF signal at said receiving means.

3. Arrangement as defined in claim 2 wherein K is equal to 2, the phase of the transmitted signal being shifted only 180°, and said frequency multiplier means multiplies the received signal by a factor of 2.

4. Arrangement as defined in claim 1 wherein Barker sequences are used as transmitted signals.

5. Arrangement as defined in claim 4 wherein the echo signals of said transmitted signals are received at the receiving means and are used as IF signals, the frequency of said received signals being raised by said frequency multiplier means to the Kn-fold value, where $n$ equals the frequency of the received signals.

6. Method of providing both optimum distance and Doppler resolution from a reflected beam which is used to obtain information regarding distant objects comprising the steps of:
    (a) modulating a signal transmitted according to selection rules for optimum distance resolving codes, by providing a $2\pi/K$ phase shift where K is an integer equal to at least 2;
    (b) receiving the echo signals of said transmitted signals from sounded objects to obtain information therefrom;
    (c) optimizing the distance resolution of the received echo signals and multiplying the frequency of the received signals by a factor of K in order to provide resolution of Doppler information carried by such signals.

7. Reflected-beam apparatus comprising, in combination:
    (a) transmitter means including:
        (1) a modulating code generator for producing an optimum distance resolving pulse code;

(2) first oscillator means, connected to said modulating code generator, for producing a high-frequency signal having a $2\pi/K$ phase shift, modulated in accordance with said pulse code, where K is an integer equal to at least 2 and (3) means, connected to said oscillator means, for transmitting a beam of said phase-modulated high-frequency signal; and (b) receiver means including:

(1) second oscillator means for producing a signal of a given frequency;

(2) means, connected to receive a signal corresponding to the reflections of said beam and to receive said signal of a given frequency, for mixing said signals and producing an output signal in response thereto;

(3) intermediate frequency amplifier means, connected to said signal mixing means, for amplifying the signal produced by said signal mixing means;

(4) optimum filter means, connected to said intermediate frequency amplifier means, for producing a signal which optimizes the distance resolution of the signal produced by said intermediate frequency amplifier means;

(5) frequency multiplier means, connected to said intermediate frequency amplifier means, for multiplying the frequency of the signal produced by said intermediate frequency amplifier means by a factor of K; and (6) means, connected to said frequency multiplier means, for analyzing the frequency of the signal produced by said frequency multiplier means.

References Cited

UNITED STATES PATENTS 3,396,392    8/1968    Fishbein et al.    343—17.2 XR

RICHARD A. FARLEY, Primary Examiner

U.S. Cl. X.R.

340—3; 343—9.